United States Patent
Yamamoto et al.

(10) Patent No.: US 10,625,558 B2
(45) Date of Patent: Apr. 21, 2020

(54) DAMPING FORCE CONTROL APPARATUS FOR SUSPENSION

(71) Applicant: AISIN SEIKI KABUSHIKI KAISHA, Kariya-shi, Aichi-ken (JP)

(72) Inventors: Akihito Yamamoto, Kariya (JP); Wataru Tanaka, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 242 days.

(21) Appl. No.: 15/790,734

(22) Filed: Oct. 23, 2017

(65) Prior Publication Data
US 2018/0111439 A1   Apr. 26, 2018

(30) Foreign Application Priority Data
Oct. 25, 2016   (JP) .................................. 2016-208866

(51) Int. Cl.
*B60G 17/018*   (2006.01)
*B60G 17/08*   (2006.01)

(52) U.S. Cl.
CPC ......... *B60G 17/0182* (2013.01); *B60G 17/08* (2013.01); *B60G 2204/4502* (2013.01);
(Continued)

(58) Field of Classification Search
CPC .............. B60G 17/0182; B60G 17/08; B60G 2204/4502; B60G 2400/208;
(Continued)

(56) References Cited

U.S. PATENT DOCUMENTS 4,696,489 A * 9/1987 Fujishiro .............. B60G 17/018
280/5.507
8,116,938 B2   2/2012   Itagaki et al.
(Continued)

FOREIGN PATENT DOCUMENTS

CN   104317983 A   *   1/2015
CN   105840752 B   *   4/2018
(Continued)

OTHER PUBLICATIONS

European Office Action dated Dec. 7, 2018 issued by the European Patent Office in corresponding European Patent Application No. 17197228.4 (8 pages).
(Continued)

*Primary Examiner* — Tuan C To
(74) *Attorney, Agent, or Firm* — Buchanan Ingersoll & Rooney PC (57) ABSTRACT

A damping force control apparatus for a suspension is applied to a damper whose damping force can be set based on a damping force control value and controls the damping force control value. The damper is attached to a support portion with a buffer member interposed between the support portion of a vehicle body and a cylinder of the damper. The apparatus includes: a displacement related quantity estimation device estimating relative displacement of a vehicle wheel and a relative speed of the vehicle wheel with respect to the vehicle body as estimated relative displacement and an estimated relative speed; and a damping force control value calculation device determining the damping force control value so as to suppress vibration of the vehicle body based on state variables provided from the vehicle body and the estimated relative speed.

14 Claims, 2 Drawing Sheets

(52) U.S. Cl.
CPC .... *B60G 2400/208* (2013.01); *B60G 2400/25* (2013.01); *B60G 2500/10* (2013.01); *B60G 2600/1871* (2013.01); *B60G 2600/1872* (2013.01); *B60G 2800/70* (2013.01)

(58) Field of Classification Search
CPC ............ B60G 2400/25; B60G 2500/10; B60G 2600/1871; B60G 2600/1872; B60G 2800/70
USPC .......................................................... 701/37
See application file for complete search history.

(56) References Cited

U.S. PATENT DOCUMENTS

| | | | | |
|---|---|---|---|---|
| 9,061,562 | B2* | 6/2015 | Hayakawa | B60G 17/01933 |
| 9,278,599 | B2* | 3/2016 | Hirao | B60G 17/018 |
| 2006/0247840 | A1* | 11/2006 | Matsuda | F02D 11/105 |
| | | | | 701/103 |
| 2006/0264295 | A1* | 11/2006 | Toyoda | F16H 61/6648 |
| | | | | 475/216 |
| 2009/0024277 | A1* | 1/2009 | Poilbout | B60G 3/04 |
| | | | | 701/38 |
| 2009/0055047 | A1* | 2/2009 | Poilbout | B60G 17/0165 |
| | | | | 701/37 |
| 2010/0023211 | A1 | 1/2010 | Ammon et al. | |
| 2010/0106368 | A1* | 4/2010 | Hidaka | B60G 17/0165 |
| | | | | 701/38 |
| 2011/0025000 | A1* | 2/2011 | Inoue | B60G 17/0157 |
| | | | | 280/5.507 |
| 2011/0029197 | A1* | 2/2011 | Uenuma | B60G 17/005 |
| | | | | 701/37 |
| 2012/0004806 | A1* | 1/2012 | Hozumi | B60G 17/08 |
| | | | | 701/37 |
| 2012/0010780 | A1* | 1/2012 | Hayashi | B60G 17/018 |
| | | | | 701/37 |
| 2012/0090242 | A1* | 4/2012 | Bocquet | E06B 9/68 |
| | | | | 49/138 |
| 2014/0005831 | A1* | 1/2014 | Naderer | B25J 9/1633 |
| | | | | 700/258 |
| 2014/0291944 | A1* | 10/2014 | Kogure | B62D 17/00 |
| | | | | 280/5.522 |
| 2014/0353934 | A1* | 12/2014 | Yabumoto | B60G 17/00 |
| | | | | 280/5.515 |
| 2015/0183289 | A1* | 7/2015 | Koumura | B60G 17/0161 |
| | | | | 701/38 |
| 2016/0009280 | A1* | 1/2016 | Tokimasa | B60W 30/16 |
| | | | | 701/96 |
| 2016/0031286 | A1* | 2/2016 | Kubota | B60G 17/08 |
| | | | | 701/37 |
| 2016/0176259 | A1 | 6/2016 | Yamamoto et al. | |
| 2017/0268912 | A1* | 9/2017 | Talbot | G01B 11/14 |

FOREIGN PATENT DOCUMENTS

| | | | |
|---|---|---|---|
| DE | 10 2004 044 474 A1 | 3/2006 | |
| EP | 1623856 A2 * | 2/2006 | ....... B60G 17/01908 |
| JP | H 10-913 A | 1/1998 | |
| JP | 2001001736 A | 1/2001 | |
| JP | 2001287528 A | 10/2001 | |
| JP | 2009083641 A | 4/2009 | |
| JP | 2010-058541 A | 3/2010 | |
| JP | 2016-117326 A | 6/2016 | |
| JP | 6349684 B2 * | 7/2018 | |

OTHER PUBLICATIONS

The extended European Search Report dated Apr. 10, 2018, by the European Patent Office in corresponding European Patent Application No. 17197228.4-1013. (11 pages).

* cited by examiner

DAMPING FORCE CONTROL APPARATUS FOR SUSPENSION

CROSS REFERENCE TO RELATED APPLICATIONS

This application is based on and claims priority under 35 U.S.C. § 119 to Japanese Patent Application 2016-208866, filed on Oct. 25, 2016, the entire contents of which are incorporated herein by reference.

TECHNICAL FIELD

This disclosure relates to a damping force control apparatus for a suspension.

BACKGROUND DISCUSSION

As a damping force control apparatus of a suspension, for example, the technique described in JP 10-913A (Reference 1) is known.

The damping force control apparatus according to the technique includes opening determination means for determining an orifice opening degree of a damper so as to control a damping force. The opening determination means determines the orifice opening degree (damping force control value) based on a vehicle body speed (absolute speed described in Reference 1) and a relative speed of a vehicle wheel with respect to a vehicle body. Here, each of the vehicle body speed and the relative speed is calculated based on the output (acceleration) obtained from an acceleration sensor of the vehicle body.

The relative speed is estimated by applying the Kalman filter theory to a modeled damper. In applying the Kalman filter theory, the damping force of the damper is classified as a linear component and a nonlinear component.

In addition, in JP 2010-58541A (Reference 2), an output deviation corresponding to the difference between the above-suspension speed (observation output) of the vehicle and the estimated above-suspension speed (estimated observation output) from a vehicle approximate model of an observer for estimating an actual vehicle model state quantity is obtained. Based on the output deviation, a first observer gain of the observer for actual damping force estimation calculates a dynamic characteristic compensation signal, and a second observer gain of an observer for actual vehicle model state quantity estimation calculates a vehicle model compensation signal. The dynamic characteristic compensation signal is input to dynamic characteristic imparting means of the observer for the actual vehicle model state quantity estimation and is used for adjusting setting contents of the dynamic characteristic imparting means.

However, in the estimation of the relative speed according to the related art described above, the estimated relative speed is greatly diverged from the actual relative speed and as a result, the orifice opening degree (damping force control value) may not be calculated as an appropriate value, that is, a value suitable for suppressing vibration of the vehicle body.

SUMMARY

A damping force control apparatus for a suspension according to an aspect of this disclosure is applied to a damper whose damping force is capable of being set based on a damping force control value and controls the damping force control value, the damper being attached to a support portion with a buffer member interposed between the support portion of a vehicle body and a cylinder of the damper, the apparatus including: a displacement related quantity estimation device which estimates relative displacement of a vehicle wheel with respect to the vehicle body and a relative speed of the vehicle wheel with respect to the vehicle body as estimated relative displacement and an estimated relative speed, and a damping force control value calculation device which determines the damping force control value so as to suppress vibration of the vehicle body based on state variables provided from the vehicle body and the estimated relative speed which is estimated by the displacement related quantity estimation device, in which the displacement related quantity estimation device estimates the estimated relative speed and the estimated relative displacement based on the state variables, the damping force control value which is determined by the damping force control calculation device, and the estimated relative speed and the estimated relative displacement which are estimated by the displacement related quantity estimation device itself.

A suspension according to an aspect of this disclosure includes: any of the damping force control apparatuses described above; a damper which is controlled by the damping force control apparatus; and a buffer member which alleviates a collision between the vehicle body to which the damper is attached and the damper.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

With reference to FIGS. 1 to 5, a damping force control apparatus for a suspension will be described.

The damping force control apparatus for a suspension (hereinafter, simply referred to as "damping force control apparatus 1") controls a damping force of a semi-active damper which is a constituent element of a suspension. The semi-active damper variably sets the damping force based on a damping force control value P input from the outside. The damping force indicates a resistance force which hinders the movement of the piston. In the following description, the semi-active damper is simply referred to as "damper 20".

The damping force control apparatus 1 calculates the damping force control value P based on a motion state of a vehicle body 100 and outputs the damping force control value P to the damper 20. The damper 20 sets the damping force based on the damping force control value P. For example, the damper 20 changes an opening degree of an orifice provided on a piston of the damper 20 based on the damping force control value P and changes an opening degree between a valve body and a valve seat. Accordingly, the damper 20 adjusts the damping force of the damper 20 by controlling a distribution amount of lubricating oil distributed between two oil chambers partitioned by the piston in the damper 20.

Figure 1:
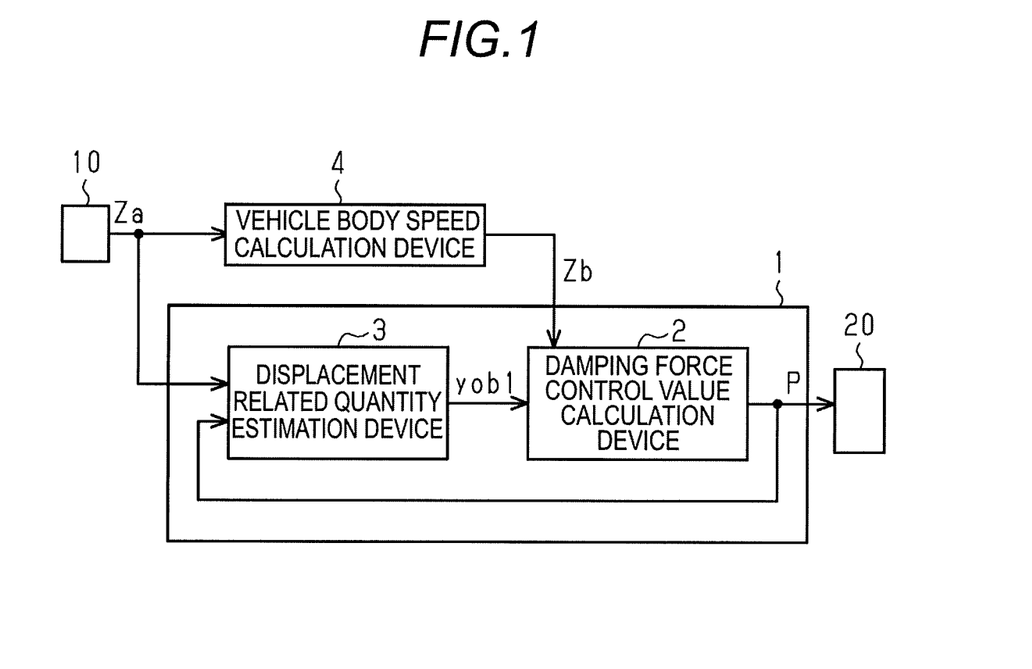
FIG. 1 is a block diagram of a damping force control apparatus for a suspension.

As illustrated in FIG. 1, the damping force control apparatus 1 calculates the damping force control value P which is output to the damper 20 based on an acceleration (hereinafter, referred to as "vehicle body acceleration Za") of the vehicle body 100 (see FIG. 2) in the vertical direction (direction along damper 20 shaft, the same as below) and a speed (hereinafter, referred to as "vehicle speed Zb") of the vehicle body 100 in the vertical direction.

The vehicle body speed Zb is derived by a vehicle body speed calculation device 4.

The vehicle body speed calculation device 4 derives the vehicle body speed Zb by integrating the vehicle body acceleration Za. In the vehicle body acceleration Za, a signal outputted from an acceleration sensor 10 mounted on the vehicle body 100 and detecting the acceleration (vehicle body acceleration Za) of the vehicle body 100 in the vertical direction is used.

The damping force control apparatus 1 includes a damping force control value calculation device 2 and a displacement related quantity estimation device 3.

The damping force control value calculation device 2 calculates the damping force control value P based on state variables and an estimated relative speed yob1. The state variables are variables such as the vehicle body acceleration Za and the vehicle body speed Zb. For example, the vehicle body speed Zb is used as a state variable in the damping force control value calculation device 2. The damping force control value calculation device 2 is constructed based on the skyhook control theory or the H∞ control theory. The estimated relative speed yob1 indicates an estimated value of the speed (hereinafter referred to as "relative speed y") of the vehicle wheel 200 with respect to the vehicle body 100.

The estimated relative speed yob1 is derived by the displacement related quantity estimation device 3.

The estimated relative speed yob1 is derived based on the state variables and the damping force control value P output from the damping force control value calculation device 2. In the displacement related quantity estimation device 3, for example, the vehicle body acceleration Za is used as a state variable. The displacement related quantity estimation device 3 is configured based on the Kalman filter theory. The displacement related quantity estimation device 3 derives the estimated relative displacement yob2 in addition to the estimated relative speed yob1 as to be described below. The estimated relative displacement yob2 indicates an estimated value of the displacement (hereinafter, referred to as "relative displacement r") of the vehicle wheel 200 with respect to the vehicle body 100.

With reference to FIGS. 1 to 5, a configuration example of the displacement related quantity estimation device 3 will be described.

Figure 2:
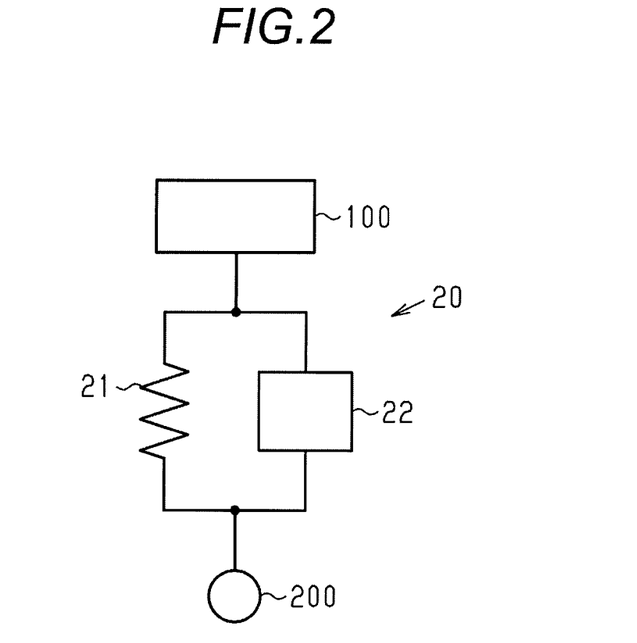
FIG. 2 is a schematic diagram of a damper.

FIG. 2 is a model of the damper 20 which is assumed based on the Kalman filter theory. The damper 20 connects between the vehicle body 100 and the vehicle wheel 200. In other words, the vehicle body 100 is supported by the vehicle wheel 200 and the damper 20.

As illustrated in FIG. 2, the damper 20 is configured by a spring 21 and a vibration damping device 22 (shock absorber).

When mass of the vehicle body 100 is referred to as "M", the vehicle body acceleration Za is referred to as "Za", a spring coefficient is referred to as K, a spring expansion and contraction distance is referred to as xs, the damping force of the vibration damping device 22 is referred to as fd(y, P), the damping force control value P of the vibration damping device 22 in the damper 20 is referred to as "P", and the relative speed y is referred to as "y", a motion equation of the vehicle body 100 is as follows.

$$M \cdot Za = K \cdot xs + fd(y, P) \qquad (1)$$

"K·xs" indicates an elastic force of the spring 21. The damping force "fd(y, P)" of the vibration damping device 22 is generally nonlinear with respect to the relative speed y (see FIG. 3). The damping force characteristic indicating the change in the damping force with respect to the relative speed y changes according to the damping force control value P. In view of the above, in the embodiment, the damping force fd(y, P) of the vibration damping device 22 is classified as a linear component and a nonlinear component.

Figure 3:
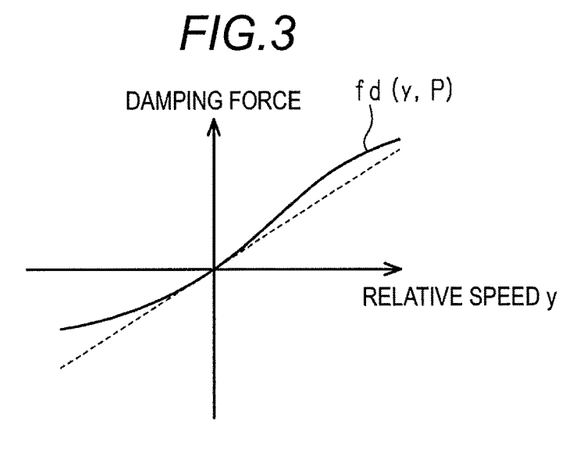
FIG. 3 is a graph of a damping force characteristic illustrating a change in a damping force with respect to a relative speed.

FIG. 3 is a graph illustrating the damping force fd(y, P) when the damping force control value P is a predetermined value.

As described above, the damping force fd(y, P) is nonlinear with respect to the relative speed y. The broken line illustrated in FIG. 3 is a first order approximation formula or an expression based on the first order approximation formula of the damping force fd(y, P) when the damping force control value P is at a predetermined value. The first order approximation formula or the expression based on the first order approximation formula corresponds to the linear component described above.

When the coefficient of the linear component is set to as Co and the nonlinear component is set to as a function fn(y, P) of the relative speed y and the damping force control value P, the damping force fd(y, P) is expressed as follows.

$$fd(y, P) = Co \cdot y + fn(y, P) \qquad (2)$$

The state equation can be derived as follows by using equation (1), equation (2), a state variable x1 meaning the relative speed y, a state variable x2 meaning the spring expansion and contraction distance.

$$X' = AX + Gw + B fn(y, P) \qquad (3)$$

Here, a column vector of X=(x1, x2), A, G, B indicates a matrix having predetermined values. X' is the derivative of X.

On the other hand, the following output equation is obtained from a relationship between the relative speed y and the vehicle body acceleration Za.

$$Y = (C, U)X + v + (D, F) fn(y, P) \qquad (4)$$

Here, Y indicates a column vector of (y1, y2), y1=relative speed y, and y2=vehicle body acceleration Za. C, U, D, and F are row vectors having predetermined values, respectively. (C, U) is a column vector with C and U as elements, and (D, F) is a column vector with D and F as elements. v indicates observation noise.

Using the Kalman filter theory, an observer for estimating y (relative speed) and r (relative displacement) based on the equations (3) and (4) described above can be obtained. In other words, the displacement related quantity estimation device 3 can be configured based on the observer of these equations.

Meanwhile, the model of the damper 20 (see FIG. 2) is a simplified version of the damper 20 attached to the vehicle body 100. On the other hand, the suspension 300 has a buffer member 23 which protects the damper 20. The buffer member 23 limits the operation of the damper 20. Therefore, the operation of the damper 20 can be changed based on not only the configuration of the damper 20 but also the buffer member 23. In the above model, the configuration of the buffer member 23 is omitted. Therefore, if the vibration damping device 22 of the damper 20 is controlled based on the damping force control value P derived by the model, the actual damping effect may diverge from the theoretical damping effect. Hereinafter, an example of the suspension 300 will be described, and the configuration of the displacement related quantity estimation device 3 reflecting the action of the buffer member 23 will be described.

Figure 4:
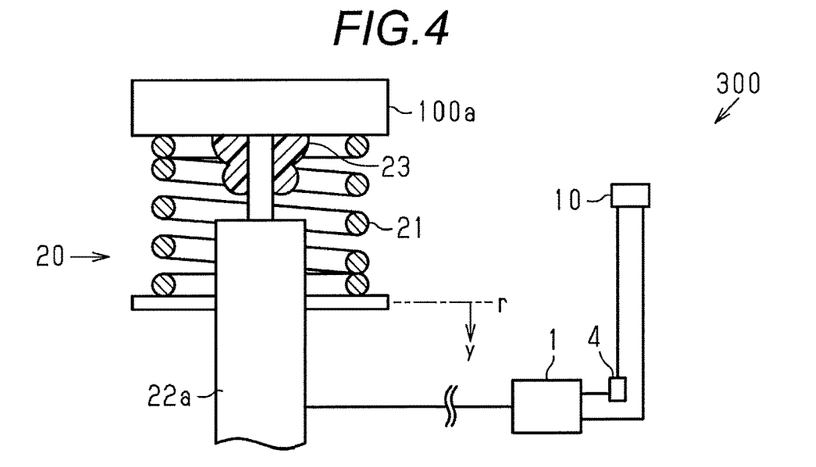
FIG. 4 is a schematic diagram of a suspension.

An example of the suspension 300 will be described with reference to FIG. 4.

The suspension 300 includes the damper 20 and the buffer member 23. The buffer member 23 alleviates collision between the support portion 100a (for example, strut mount, component attached to the periphery of strut mount and the like) of the vehicle body 100 to which the damper 20 is attached and the cylinder 22a of the damper 20.

Specifically, the buffer member 23 is disposed between the support portion 100a of the vehicle body 100 and the cylinder 22a of the damper 20 and prevents the cylinder 22a of the damper 20 from being in contact with the support portion 100a. The buffer member 23 is configured by an expandable and contractible elastic body. When the vibration damping device 22 operates and thus the distance between the cylinder 22a and the support portion 100a falls within a specified range, an end surface of the cylinder 22a is in contact with the buffer member 23. When the cylinder 22a further approaches the support portion 100a, the buffer member 23 is compressed by the pressing force of the cylinder 22a and the cylinder 22a receives a force in a direction opposite to the traveling direction from the buffer member 23. As a result, the buffer member 23 acts as follows. In other words, when a force to push up the vehicle wheel 200 is applied to the damper 20, the cylinder 22a abruptly moves due to the force, but the buffer member 23 prevents the cylinder 22a from being directly in contact with the support portion 100a and alleviates the moving speed of the cylinder 22a.

Since the buffer member 23 is an elastic body, the buffer member 23 affects a term (K·xs) of the spring in the motion equation of the vehicle body 100 of the above equation (1). The term "K·xs" is linear with respect to the spring expansion and contraction distance xs. However, due to the presence of the buffer member 23, in practice, the term "K·xs" becomes nonlinear, for example, a nonlinear function f(xs) of the variable "xs". When the equation "M·Za=f(xs)+fd(y, P) . . . (1)" set described above and the above equation (2) are used, a new state equation can be obtained. Based on the Kalman filter theory, an observer for estimating y (relative speed) and r (relative displacement) can be obtained from a new state equation and the output equation (4). The presence of the buffer member 23 is reflected in y (relative speed) and r (relative displacement) as described above.

Figure 5:
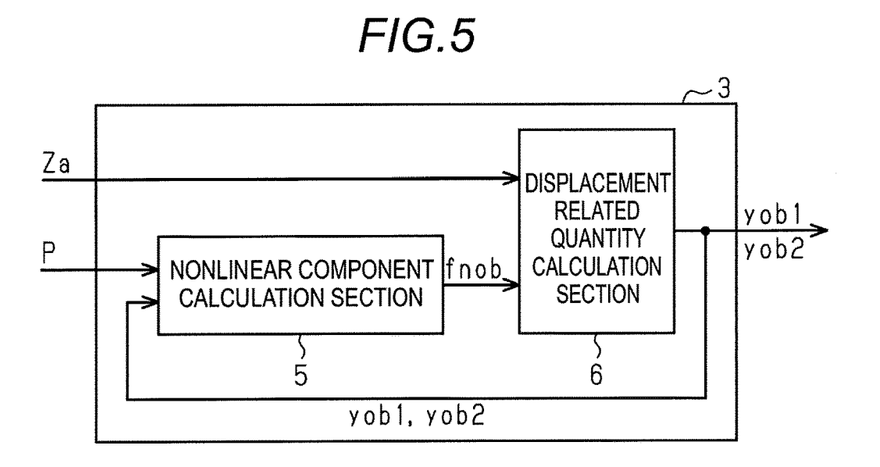
FIG. 5 is a block diagram of a displacement related quantity estimation device.

FIG. 5 is a block diagram of the displacement related quantity estimation device 3. The displacement related quantity estimation device 3 includes a nonlinear component calculation section 5 and a displacement related quantity calculation section 6.

The nonlinear component calculation section 5 derives the nonlinear component fnob based on the estimated relative displacement yob2 and the damping force control value P.

The nonlinear component calculation section 5 has a function (hereinafter referred to as "nonlinear component function") for forming the nonlinear component fnob.

The nonlinear component function includes the following predetermined function. The function derives the nonlinear component fnob based on the estimated relative displacement yob2 and the damping force control value P. The nonlinear component fnob indicates a divergence component from the linearity of the damping force with respect to the relative displacement r and is defined as an estimated value of the divergence component. For example, a component obtained by subtracting a linear component approximated to a curve of the damping force plotted with respect to the relative displacement r from the curve is taken as a nonlinear component. The function is configured as a map or the like indicating the relationship between variables configured by a pair of the estimated relative displacement yob2 and the damping force control value P and the nonlinear component.

The nonlinear component fnob indicates the degree of influence thereof when the nonlinear component of the actions of the spring 21 and the buffer member 23 influences the state variables. The action of the buffer member 23 contributes to the nonlinear component fnob in particular. The function is set based on tests performed in advance.

In addition to the functions described above, the nonlinear component function may include another function (hereinafter, additional function). The additional function derives the nonlinear component fnob based on the estimated relative speed yob1 and the damping force control value R The nonlinear component fnob is a nonlinear component which is a divergence component from the linearity of the damping force with respect to the relative speed and is defined as an estimated value of the nonlinear component. For example, a component obtained by subtracting a linear component approximated to a curve of the damping force plotted with respect to the relative speed from the curve is taken as a nonlinear component. The additional function is configured as a map or the like indicating a relationship between variables configured by a pair of the estimated relative speed yob1 and the damping force control value P and the nonlinear component.

When the nonlinear component fnob of the actions of the damper 20 affects the state variables, the nonlinear component fnob indicates the degree of the influence thereof. In a case where the nonlinear component function includes the functions and an additional function, the sum of the nonlinear component fnob derived by the first function and the nonlinear component fnob derived by the additional function is added and the sum is output as the nonlinear component fnob.

The displacement related quantity calculation section 6 derives the estimated relative speed yob1 and the estimated relative displacement yob2 based on the nonlinear component fnob and the state variables of the vehicle body 100. The displacement related quantity calculation section 6 is configured based on an observer. In the embodiment, the vehicle body acceleration Za provided from the vehicle body 100 is used as a state variable.

Next, the action of the damping force control apparatus 1 will be described.

First, the damping force control apparatus 1 of a comparative reference example will be described. Using the observer constructed from the model of the damper 20 (see FIG. 2), the damping force control apparatus 1 of the reference example uses the vehicle body acceleration Za provided from the vehicle body 100 to derive the estimated relative speed yob1 and the damping force control value P. The vehicle body acceleration Za indicates the state of the vehicle body 100 at the time when the vehicle body acceleration Za is provided from the vehicle body 100 regardless of the presence or absence of the buffer member 23. Therefore, the vehicle body acceleration Za includes the influence of the contact between the buffer member 23 and the cylinder 22a of the damper 20. However, it is difficult to accurately estimate the estimated relative speed yob1 in the calculation of the estimated relative speed yob1 in the reference example. Hereinafter, this point will be described below.

At the time point when the cylinder 22a is in contact with the buffer member 23 (hereinafter referred to as contact time point) since the movement of the cylinder 22a is hindered, the acceleration greatly changes. On the other hand, since the vehicle body acceleration Za used for the calculation at the contact time point is a value obtained immediately before the contact therebetween, the estimated relative speed yob1 estimated at the time point largely diverges from the actual value. As a result, the damping force control value P derived from the estimated relative speed yob1 deviates from a value suitable for suppressing the vibration of the vehicle body 100.

In addition, the same actions also occur at the time point (hereinafter referred to as separation time point) when the cylinder 22a separates from the buffer member 23 as that in a state where the buffer member 23 and the cylinder 22a are in contact with each other. In other words, at the time point when the cylinder 22a separates from the buffer member 23 (the point of separation) since the pressing force to the cylinder 22a based on the expansion of the buffer member 23 disappears, the acceleration greatly changes. On the other hand, since the vehicle body acceleration Za used for the calculation at this separation time point is a value obtained immediately before the separation, the estimated relative speed yob1 estimated at the time point greatly diverges from the actual value. As a result, the damping force control value P derived from the estimated relative speed yob1 deviates from a value suitable for suppressing the vibration of the vehicle body 100.

In addition, such "divergence" of the vehicle body acceleration Za occurs similarly even at time points other than the contact time point and the separation time point. In other words, it is considered that the divergence of the estimated relative speed yob1 occurs for the same reason only in a period in which the buffer member 23 and the cylinder 22a act a force on each other by being in contact with each other.

Therefore, in the embodiment, in the calculation for deriving the estimated relative speed yob1, information on the estimated relative displacement yob2 is reflected. The nonlinear component calculation section 5 estimates the nonlinear component fnob on the nonlinear component fnob used by the displacement related quantity calculation section 6 in calculating the estimated relative speed yob1 based on predetermined information. Specifically, the nonlinear component function of the displacement related quantity calculation section 6 derives the nonlinear component fnob with respect to the estimated relative displacement yob2. The nonlinear component fnob is derived by the above function. The nonlinear component fnob may be derived in the range of the estimated relative displacement yob2 in which the buffer member 23 and the cylinder 22a can be in contact with each other. Then, the nonlinear component fnob is used for deriving the estimated relative speed yob1. Accordingly, "divergence" between the estimated relative speed yob1 and the actual relative speed is suppressed. Therefore, according to the nonlinear component fnob including the nonlinear component caused by the estimated relative displacement yob2, the estimated relative speed yob1 is precisely estimated.

Next, effects of the damping force control apparatus 1 according to the present embodiment will be described.

(1) The damping force control apparatus 1 includes the damping force control value calculation device 2 and the displacement related quantity estimation device 3. The damping force control value calculation device 2 determines the damping force control value P based on the state variables of the vehicle body 100 and the estimated relative speed yob1 (see FIG. 1). The displacement related quantity estimation device 3 estimates the estimated relative speed yob1 and the estimated relative displacement yob2 based on the estimated relative speed yob1 and the estimated relative displacement yob2 estimated by the state variables of the vehicle body 100, the damping force control value P, and the displacement related quantity estimation device 3 itself (see FIG. 5).

With the configuration, the estimated relative speed yob1 and the estimated relative displacement yob2 output by the displacement related quantity estimation device 3 are fed back to the displacement related quantity estimation device 3. Therefore, since the estimated relative displacement yob2 is reflected in the estimated relative speed yob1 and the estimated relative displacement yob2 during the calculation of the estimated relative speed yob1 and the estimated relative displacement yob2, accuracy of the estimated relative speed yob1 and the estimated relative displacement yob2 is improved and as a result, accuracy of the damping force control value P is improved compared to the reference damping force control apparatus that does not reflect the estimated relative displacement yob2.

(2) The displacement related quantity estimation device 3 includes the nonlinear component calculation section 5 and the displacement related quantity calculation section 6. The nonlinear component calculation section 5 derives the nonlinear component fnob based on the damping force control value P and the estimated relative displacement yob2. The displacement related quantity calculation section 6 estimates the estimated relative speed yob1 and the estimated relative displacement yob2 based on the nonlinear component fnob and the state variables.

With the configuration, the displacement related quantity estimation device 3 derives the nonlinear component fnob. The nonlinear component fnob is derived based on the damping force control value P and the estimated relative displacement yob2. Therefore, since the estimated relative displacement yob2 is reflected in the nonlinear component fnob, the accuracy of the estimated relative speed yob1 and the estimated relative displacement yob2 is improved compared to a case where the nonlinear component fnob is derived without using the estimated relative displacement yob2.

(3) In the damping force control apparatus 1, the nonlinear component calculation section 5 has a function of deriving the nonlinear component fnob in the range of the estimated relative displacement that the buffer member and the cylinder of the damper can be in contact with each other. With the configuration, at least the nonlinear component fnob is derived within the range of the estimated relative displacement in which the buffer member 23 and the cylinder 22a of the damper 20 can be in contact with each other.

(4) The use range of the estimated relative speed yob1, the estimated relative displacement yob2, and the damping force control value P is limited in a predetermined function (nonlinear component function described above). For example, the predetermined function (nonlinear component function described above) derives the nonlinear component fnob by using the variables (that is, estimated relative displacement yob2, estimated relative speed yob1, and damping force control value P) including the estimated relative displacement yob2 only when the estimated relative displacement yob2 is within the specified range. On the other hand, when the estimated relative displacement yob2 is outside the specified range, the nonlinear component fnob is derived by using variables (that is, estimated relative speed yob1 and damping force control value P) other than the estimated relative displacement yob2. Here, within the specified range, a distance range between the vehicle body 100 and the vehicle wheel 200 which constitutes a state where the damper 20 is in contact with the buffer member 23 is indicated. With such a configuration, the burden on the damping force control apparatus 1 is reduced as compared with a case where the nonlinear component fnob is always derived by using all variables.

(5) The suspension 300 (see FIG. 4) includes the damping force control apparatus 1, the damper 20 which is controlled by the damping force control apparatus 1, and the buffer member 23 which alleviates collision between the vehicle body 100 to which the damper 20 is attached and the cylinder 22a of the damper 20. With the configuration, the damper 20 is controlled by the damping force control value P on which the estimated relative displacement yob2 is reflected. Therefore, the damping characteristic of the suspension 300 is improved.

Other Embodiments

In the damping force control apparatus 1 of the embodiment, the damping force control apparatus 1 can be configured so that the vehicle body acceleration Za and the vehicle body speed Zb are used as the state variables of the vehicle body 100 as follows. In other words, the damping force control apparatus 1 is configured to include the vehicle body speed calculation device 4 described above. In this case, in the damping force control apparatus 1, only the vehicle body acceleration Za is input as the state variable of the vehicle body 100.

An example of "additional function" described in the embodiment described above will be described.

The additional function includes a function as a "delay correction term" (hereinafter, "delay correction function"). The additional function is a function for improving the following event.

When the specification of the actual suspension is largely diverged from that of the model of the damper 20, the estimation accuracy of the estimated relative speed yob1 may decrease. For example, in a case where the specification of the actual suspension is full hardware or full software, the estimated relative speed yob1 and the actual relative speed can greatly diverge. This divergence appears as a delay of the damping force control value P in time series.

"Delay correction function" is a calculation term (delay correction term) for suppressing such divergence.

The delay correction function is, for example, a function with the damping force control value P at the time of calculation as a variable. The delay correction function is set in advance as a calculation expression, a map, or the like according to the specification of the damper 20 (full software, full hardware, intermediate state thereof or the like). Therefore, by inputting the damping force control value P derived by calculation to the delay correction function, the nonlinear component is derived from the delay correction function.

In addition, the delay correction function can be configured as a plurality of function groups corresponding to the specification of the damper 20. The plurality of function groups is a group of functions set for each different specification of the damper 20 (full software, full hardware, intermediate state thereof or the like). The vibration period of the vehicle body is obtained based on actual relative speed data and the specification of the damper 20 can be estimated based on the obtained vibration period. Accordingly, from the estimated specification of the damper 20, a function corresponding to the specification thereof is selected from a group of functions. Then, a nonlinear component is derived by using the selected function.

In the nonlinear component calculation section 5, the "nonlinear component" derived from the delay correction function (that is, delay correction term) and the "nonlinear component" described in the embodiment are weighted with coefficients, added, and then the result thereof is output.

In the case of this example, the nonlinear component calculation section 5 derives a "nonlinear component" related to the estimated relative displacement yob2 and estimated relative speed yob1 based on the damping force control value P determined by the damping force control value calculation device 2 and the estimated relative displacement yob2 and estimated relative speed yob1 estimated by displacement related quantity estimation device 3.

(1) A damping force control apparatus for a suspension according to an aspect of this disclosure is applied to a damper whose damping force is capable of being set based on a damping force control value and controls the damping force control value, the damper being attached to a support portion with a buffer member interposed between the support portion of a vehicle body and a cylinder of the damper, the apparatus including: a displacement related quantity estimation device which estimates relative displacement of a vehicle wheel with respect to the vehicle body and a relative speed of the vehicle wheel with respect to the vehicle body as estimated relative displacement and an estimated relative speed, and a damping force control value calculation device which determines the damping force control value so as to suppress vibration of the vehicle body based on state variables provided from the vehicle body and the estimated relative speed which is estimated by the displacement related quantity estimation device, in which the displacement related quantity estimation device estimates the estimated relative speed and the estimated relative displacement based on the state variables, the damping force control value which is determined by the damping force control calculation device, and the estimated relative speed and the estimated relative displacement which are estimated by the displacement related quantity estimation device itself.

With this configuration, the estimated relative speed and the estimated relative displacement output by the displacement related quantity estimation device are fed back to the displacement related quantity estimation device. Therefore, since the estimated relative displacement is reflected in the estimated relative speed and the estimated relative displacement during the calculation of the estimated relative speed and the estimated relative displacement, accuracy of the estimated relative speed and the estimated relative displacement is improved and as a result, accuracy of the damping force control value is improved compared to the reference damping force control apparatus that does not reflect the estimated relative displacement.

(2) In the damping force control apparatus for a suspension, the displacement related quantity estimation device may include a nonlinear component calculation section which derives a nonlinear component with respect to the estimated relative displacement based on the damping force control value determined by the damping force control value calculation device and the estimated relative displacement estimated by the displacement related quantity estimation device, and a displacement related quantity calculation section which estimates the estimated relative speed and the estimated relative displacement based on the nonlinear component and the state variables.

With this configuration, the displacement related quantity estimation device derives the nonlinear component. The nonlinear component is derived based on the damping force control value and the estimated relative displacement. Therefore, since the estimated relative displacement is reflected in the nonlinear component, the accuracy of the estimated relative speed and the estimated relative displacement is improved as compared with a case where the nonlinear component is derived without using the estimated relative displacement.

(3) In the damping force control apparatus for a suspension, the nonlinear component calculation section may have a function of deriving the nonlinear component in the range of the estimated relative displacement in which the buffer member and the cylinder of the damper can be in contact with each other. With this configuration, at least the nonlinear component is derived within the range of the estimated relative displacement in which the buffer member and the cylinder of the damper can be in contact with each other.

(4) In the damping force control apparatus for a suspension, when the estimated relative displacement is within a specified range, the function may derive the nonlinear component based on all the variables of a variable group consisting of the damping force control value, the estimated relative speed, and the estimated relative displacement, and when the estimated relative displacement is outside the specified range, the function may correct the estimated relative displacement by using variables other than the estimated relative displacement of the variable group, and the specified range corresponds to a distance range between the vehicle body and the vehicle wheel in which the buffer member and the damper are in contact with each other.

With this configuration, only when the estimated relative displacement is within the specified range, the nonlinear component is derived based on the variables including the estimated relative displacement (that is, estimated relative displacement, estimated relative speed, and damping force control value). On the other hand, when the estimated relative displacement is outside the specified range, a nonlinear component is derived based on the variables other than the estimated relative displacement (that is, estimated relative speed and damping force control value). Therefore, the burden on the damping force control apparatus is reduced as compared with a case where the nonlinear component is always derived using all variables.

(5) A suspension according to an aspect of this disclosure includes: any of the damping force control apparatuses described above; a damper which is controlled by the damping force control apparatus; and a buffer member which alleviates a collision between the vehicle body to which the damper is attached and the damper.

With this configuration, the damper is controlled by the damping force control value reflecting the estimated relative displacement. Therefore, the damping characteristic of the suspension is improved.

The damping force control apparatus for a suspension derives a damping force control value suitable for vibration suppression of the vehicle body.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A damping force control apparatus for a suspension that is applied to a damper whose damping force is set based on a damping force control value, the damper being attached to a support portion with a buffer member interposed between the support portion of a vehicle body and a cylinder of the damper, the apparatus comprising a controller configured to:
   estimate relative displacement of a vehicle wheel with respect to the vehicle body and a relative speed of the vehicle wheel with respect to the vehicle body as estimated relative displacement and an estimated relative speed;
   determine the damping force control value so as to suppress vibration of the vehicle body based on state variables provided from the vehicle body and the estimated relative speed; and
   estimate the estimated relative speed and the estimated relative displacement based on the state variables, the determined damping force control value, and the estimated relative speed and the estimated relative displacement.

2. The damping force control apparatus according to claim 1, wherein the controller is further configured to:
   the derive a nonlinear component with respect to the estimated relative displacement based on the determined damping force control value and the estimated relative displacement; and
   estimate the estimated relative speed and the estimated relative displacement based on the nonlinear component and the state variables.

3. The damping force control apparatus according to claim 2, wherein the controller is further configured to derive the nonlinear component in the range of the estimated relative displacement in which the buffer member and the cylinder of the damper can be in contact with each other.

4. The damping force control apparatus according to claim 3,
   wherein when the estimated relative displacement is within a specified range, the nonlinear component is derived based on all the variables of a variable group consisting of the damping force control value, the estimated relative speed, and the estimated relative displacement, and when the estimated relative displacement is outside the specified range, the estimated relative displacement is corrected by using variables other than the estimated relative displacement of the variable group, and
   wherein the specified range corresponds to a distance range between the vehicle body and the vehicle wheel in which the buffer member and the damper are in contact with each other.

5. A suspension comprising:
   the damping force control apparatus according to claim 1;
   a damper which is controlled by the controller of the damping force control apparatus; and
   a buffer member which alleviates a collision between the vehicle body to which the damper is attached and the damper.

6. A damper, comprising:

a cylinder configured to be attached to a support portion of a vehicle body with a buffer member interposed between the support portion and the cylinder; and a damping force control apparatus configured to set a damping force of the cylinder based on a damping force control value and to control the damping force control value, wherein the damping force control apparatus estimates relative displacement of a vehicle wheel with respect to the vehicle body and a relative speed of the vehicle wheel with respect to the vehicle body as estimated relative displacement and an estimated relative speed;

the damping force control apparatus determines the damping force control value so as to suppress vibration of the vehicle body based on state variables provided from the vehicle body and the estimated relative speed; and the damping force control apparatus estimates the estimated relative speed and the estimated relative displacement based on the state variables, the determined damping force control value, and the estimated relative speed and the estimated relative displacement.

7. The damper according to claim 6, wherein the damping force control apparatus derives a nonlinear component with respect to the estimated relative displacement based on the determined damping force control value and the estimated relative displacement; and the damping force control apparatus estimates the estimated relative speed and the estimated relative displacement based on the nonlinear component and the state variables.

8. The damper according to claim 7, wherein the damping force control apparatus derives the nonlinear component in the range of the estimated relative displacement in which the buffer member and the cylinder of the damper can be in contact with each other.

9. The damper according to claim 8, wherein when the estimated relative displacement is within a specified range, the nonlinear component is derived based on all the variables of a variable group consisting of the damping force control value, the estimated relative speed, and the estimated relative displacement, and when the estimated relative displacement is outside the specified range, the estimated relative displacement is corrected by using variables other than the estimated relative displacement of the variable group, and wherein the specified range corresponds to a distance range between the vehicle body and the vehicle wheel in which the buffer member and the damper are in contact with each other.

10. A suspension comprising:

the damper according to claim 6; and a buffer member which alleviates a collision between the vehicle body to which the damper is attached and the damper.

11. A method of controlling a suspension having a damper whose damping force is set based on a damping force, the damper being attached to a support portion with a buffer member interposed between the support portion of a vehicle body and a cylinder of the damper, the method comprising:

estimating relative displacement of a vehicle wheel with respect to a vehicle body and a relative speed of the vehicle wheel with respect to the vehicle body as estimated relative displacement and an estimated relative speed;

determining a damping force control value so as to suppress vibration of the vehicle body based on state variables provided from the vehicle body and the estimated relative speed;

estimating the estimated relative speed and the estimated relative displacement based on the state variables, the determined damping force control value, and the estimated relative speed and the estimated relative displacement; and controlling the damper of the suspension based on the damping force control value.

12. The method according to claim 11, further comprising:

deriving a nonlinear component with respect to the estimated relative displacement based on the determined damping force control value and the estimated relative displacement; and estimating the estimated relative speed and the estimated relative displacement based on the nonlinear component and the state variables.

13. The method according to claim 12, further comprising deriving the nonlinear component in the range of the estimated relative displacement in which the buffer member and the cylinder of the damper can be in contact with each other.

14. The damper according to claim 13, wherein when the estimated relative displacement is within a specified range, the nonlinear component is derived based on all the variables of a variable group consisting of the damping force control value, the estimated relative speed, and the estimated relative displacement, and when the estimated relative displacement is outside the specified range, the estimated relative displacement is corrected by using variables other than the estimated relative displacement of the variable group, and wherein the specified range corresponds to a distance range between the vehicle body and the vehicle wheel in which the buffer member and the damper are in contact with each other.

* * * * *